(12) United States Patent
Glezer et al.

(10) Patent No.: US 10,928,839 B2
(45) Date of Patent: Feb. 23, 2021

(54) SYSTEM AND METHOD FOR DISTRIBUTED ACTIVE FLUIDIC BLEED CONTROL

(71) Applicant: Georgia Tech Research Corporation, Atlanta, GA (US)

(72) Inventors: Ari Glezer, Atlanta, GA (US); John M. Kearney, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 266 days.

(21) Appl. No.: 14/173,772

(22) Filed: Feb. 5, 2014

(65) Prior Publication Data

US 2016/0009374 A1 Jan. 14, 2016

Related U.S. Application Data

(60) Provisional application No. 61/761,282, filed on Feb. 6, 2013.

(51) Int. Cl.
| | | |
|---|---|---|
| *B64C 13/00* | (2006.01) | |
| *G05D 7/01* | (2006.01) | |
| *B64C 21/08* | (2006.01) | |
| *B64C 21/02* | (2006.01) | |

(52) U.S. Cl.
CPC .............. *G05D 7/01* (2013.01); *B64C 21/025* (2013.01); *B64C 21/08* (2013.01); *B64C 2230/06* (2013.01); *Y02T 50/10* (2013.01)

(58) Field of Classification Search
CPC ....... B64C 13/00; B64C 21/025; B64C 21/08; B64C 2230/06; B64C 21/02; B64C 2230/04; G05D 7/01; F03D 7/022; F03D 7/0296; F03D 1/675; F03D 1/0683; F03D 1/0675; F03D 1/0055; F03D 1/0095; F15D 1/0055; F15D 1/008
See application file for complete search history.

(56) References Cited

U.S. PATENT DOCUMENTS

| | | | | |
|---|---|---|---|---|
| 1,810,693 | A * | 6/1931 | Alfaro | B64C 21/02 244/204 |
| 2,585,676 | A * | 2/1952 | Poisson-Quinton | B64C 21/025 244/208 |
| 4,522,360 | A * | 6/1985 | Barnwell | B64C 21/025 244/130 |
| 5,209,438 | A * | 5/1993 | Wygnanski | B64C 23/00 244/200.1 |
| 5,934,611 | A * | 8/1999 | Tindell | B64C 21/025 181/214 |
| 6,866,233 | B2 * | 3/2005 | Patel | B64C 21/025 244/204 |
| 7,246,529 | B1 * | 7/2007 | Powell | B64C 21/025 73/861 |

(Continued)

*Primary Examiner* — Medhat Badawi
*Assistant Examiner* — Vicente Rodriguez
(74) *Attorney, Agent, or Firm* — Troutman Pepper Hamilton Sanders LLP; Ryan A. Schneider

(57) ABSTRACT

A system and method for regulating and actuating bleed over a structure exposed in a fluid motion are disclosed. The bleed inlet and outlet are formed on the surface of the structure establishing fluidic communication across surfaces. The disclosed system and method contemplates active control and regulation of the bleed to modify crossflow properties such as, aerodynamic forces, hydrodynamic forces, vorticity, and moments.

33 Claims, 14 Drawing Sheets

(56) References Cited

U.S. PATENT DOCUMENTS

| | | | | |
|---|---|---|---|---|
| 7,708,229 B1* | 5/2010 | Angle, II | ................ | B64C 21/08 |
| | | | | 244/206 |
| 8,240,993 B2* | 8/2012 | Bhaisora | ............... | F03D 1/0633 |
| | | | | 416/231 R |
| 2002/0190165 A1* | 12/2002 | Glezer | .................. | B64C 21/025 |
| | | | | 244/204 |
| 2003/0150962 A1* | 8/2003 | Orban | .................. | B64C 21/025 |
| | | | | 244/209 |
| 2007/0095987 A1* | 5/2007 | Glezer | .................. | B64C 21/08 |
| | | | | 244/200.1 |
| 2009/0001222 A1* | 1/2009 | McKeon | ................ | B62D 35/00 |
| | | | | 244/204 |
| 2009/0261204 A1* | 10/2009 | Pitt | ........................ | B64C 21/08 |
| | | | | 244/201 |
| 2009/0321580 A1* | 12/2009 | Boldrin | .................. | B64C 21/08 |
| | | | | 244/208 |
| 2010/0115820 A1* | 5/2010 | Perevoshchikov | | |
| 2010/0181434 A1* | 7/2010 | Powell | .................... | B64C 21/08 |
| | | | | 244/209 |
| 2010/0181435 A1* | 7/2010 | Sakurai | .................. | B64C 21/02 |
| | | | | 244/209 |
| 2011/0206507 A1* | 8/2011 | Bhaisora | ............... | F03D 1/0633 |
| | | | | 416/1 |
| 2012/0043428 A1* | 2/2012 | Goelling | .................. | B64C 9/18 |
| | | | | 244/208 |
| 2012/0280088 A1* | 11/2012 | Sakurai | .................. | B64C 21/02 |
| | | | | 244/208 |
| 2012/0301296 A1* | 11/2012 | Greenblatt | .......... | H04L 65/1053 |
| | | | | 416/1 |
| 2013/0062473 A1* | 3/2013 | Golling | ................ | B64C 21/025 |
| | | | | 244/208 |

* cited by examiner

When the bleed flow exits out to the crossflow, an interaction between the bleed flow and the crossflow generates vorticity concentrations near the surface of the airfoil. Airfoil design can dictate vorticity regulation, so the shape of the airfoil can be designed to beneficially regulate bleed flow.

SYSTEM AND METHOD FOR DISTRIBUTED ACTIVE FLUIDIC BLEED CONTROL

CROSS-REFERENCE TO RELATED APPLICATIONS

This application claims the benefit of U.S. Provisional Application No. 61/761,282 filed 6 Feb. 2013, the entire contents and substance of which is hereby incorporated by reference.

STATEMENT REGARDING FEDERALLY SPONSORED RESEARCH OR DEVELOPMENT

This invention was made with Government support under Agreement FA9550-08-1-0398, awarded by the Air Force. The Government has certain rights in the invention

BACKGROUND OF THE INVENTION

Field of the Invention

The present invention relates generally to fluid dynamics and bleed technology. More particularly, the present invention relates to system and method for active bleed regulation that can lead to control of global forces and structural stabilization.

Description of Related Art

Control of a moving body through a fluid has been traditionally achieved by employing a moving control surface to the moving body. The moving control surface, such as a flap or rudder, alters the fluid flow around the moving body, thereby achieving control, such as, roll, pitch, and yaw movements.

Alternatively, the use of passive porosity for aerodynamic flow control exploits differences in the inherent pressure distribution induced by fluid motion over a surface. Passive porosity per se is well-known and has been investigated for many years. In its typical application, fluid is bled from high to low pressure through passive porosities forming a channel of flow passage across a moving surface. In turn, the use of passive porosity alters the flow over the moving surface. However, utilization of passive porosity is limited by factors such as inability to alter the control and to enable continuous regulation over a time-dependent movement of the moving surface.

The moving control surface does provide active control and regulation of the fluid flow, however, such control mechanisms are flawed with significant added weight and complexity which lead to cumbersome design restrictions of the moving body. In addition, conventional control surfaces fail to generate sufficient control authority due to mechanical damage or design limits.

By way of example, flutter vibration can cause structural destabilization which can damage an aircraft in-flight. Flutter is a self-starting and potentially destructive vibration where aerodynamic forces on an object coupled with a structure's natural mode of vibration produce rapid periodic motion.

Therefore, what is needed is a system and method for regulating bleed flow which accomplishes time-dependent adjustment of porosities and ability to regulate or control the global forces on the surface. Also, what is needed is a system and method for steering or maneuvering a moving body through a fluid with minimal flutter or vibration effect.

BRIEF SUMMARY OF THE INVENTION

Briefly described, in a preferred form, the present invention comprises an active bleed regulation which enables modifications and alterations of lifting force, pitching moment, and yawing moment of a structure in fluid motion which provides an alternative to conventional control surfaces on aircraft or rotorcraft and control authority enhancement on moving bodies such as wind turbine blades or automotive vehicles.

The subject matter of this application may involve, in some cases, interrelated products, alternative solutions to a particular problem, and/or a plurality of different uses of a single system or article.

It is another objective of the present invention to demonstrate active bleed regulation that can also fundamentally alter the effective stiffness, structural coupling, and damping properties of the structure and thus provide the ability to mitigate or completely avoid adverse consequences of flow-induced vibrations and aeroelastic instabilities.

It is a further objective of the present invention to illustrate an active bleed regulating system to tailor the aeroelastic behavior of a structure, such as, a wing or other lifting surface. This can be done by varying the aerodynamic loads as a function of the elastic deflection to dampen structural dynamics of the surface.

In one aspect, a distributed active fluid bleed system is presented. The distributed active fluid bleed system may regulate a bleed flow to modify parameters of fluid in a crossflow over a structure. The distributed active fluid bleed system may comprise one or more bleed flow passages, one or more bleed inlets, one or more bleed outlets, one or more actuation mechanisms, and one or more actuators. The one or more bleed flow passages may be formed through the structure where the one or more bleed inlets receives the crossflow through the one or more bleed passages at a high pressure region of the crossflow. The one or more bleed outlets may release the received crossflow out into a low pressure region of the crossflow, thereby forming the bleed flow. The actuation mechanisms may be coupled to at least one of the one or more bleed inlets and bleed outlets, allowing the circulation of the bleed flow through at least one of the one or more bleed flow passages in an open position, and preventing the circulation in a closed position. Further, one or more actuators may be operatively coupled to each of the one or more actuation mechanisms.

In another aspect, a method of regulating a bleed flow to modify parameters of fluid in a crossflow over a structure is presented. The structure may define a bleed flow passage formed therein. The method may carry out the following steps. First a bleed inlet and a bleed outlet may be formed on the surface of the structure. The bleed inlet may receive the crossflow from a high pressure region through the bleed flow passage. The bleed outlet may release the received crossflow through the bleed flow passage into a lower pressure region of the crossflow. In turn the bleed flow may be actuated flowing from the bleed inlet to the bleed outlet. The actuator mechanism may be selectively moved between an open position and a closed position, where the bleed flow is actuated if the actuator mechanism is at the open position. The parameters of fluid in the crossflow may be modified when the bleed flow is regulated.

In yet another aspect, an airfoil design is provided. The airfoil may comprise a bleed flow passage defined within a body. A plurality of bleed inlets and outlets may be formed on a surface of the body. The plurality of bleed inlets and outlets may be constructed and positioned to modify at least one of: pressure distribution, aerodynamic forces, vorticity, and moment, of the crossflow streaming about the airfoil. The plurality of inlets and outlets may be in communicative connection with each other, circulating the bleed flow. A plurality of louvers may further comprise the airfoil. Each of the plurality of louvers may selectively seal at least one of the plurality of bleed inlets and bleed outlets when the plurality of louvers is at a closed position. Accordingly, the bleed flow is actuated once the pluralities of louvers are at an open position. A plurality of actuators may be operatively coupled to each of the plurality of louvers, moving each of the plurality of louvers selectively. At last, a bleed control system may further comprise the airfoil. The bleed control system may regulate operation of each of the plurality of actuators.

DETAIL DESCRIPTION OF THE INVENTION

Figure 1:
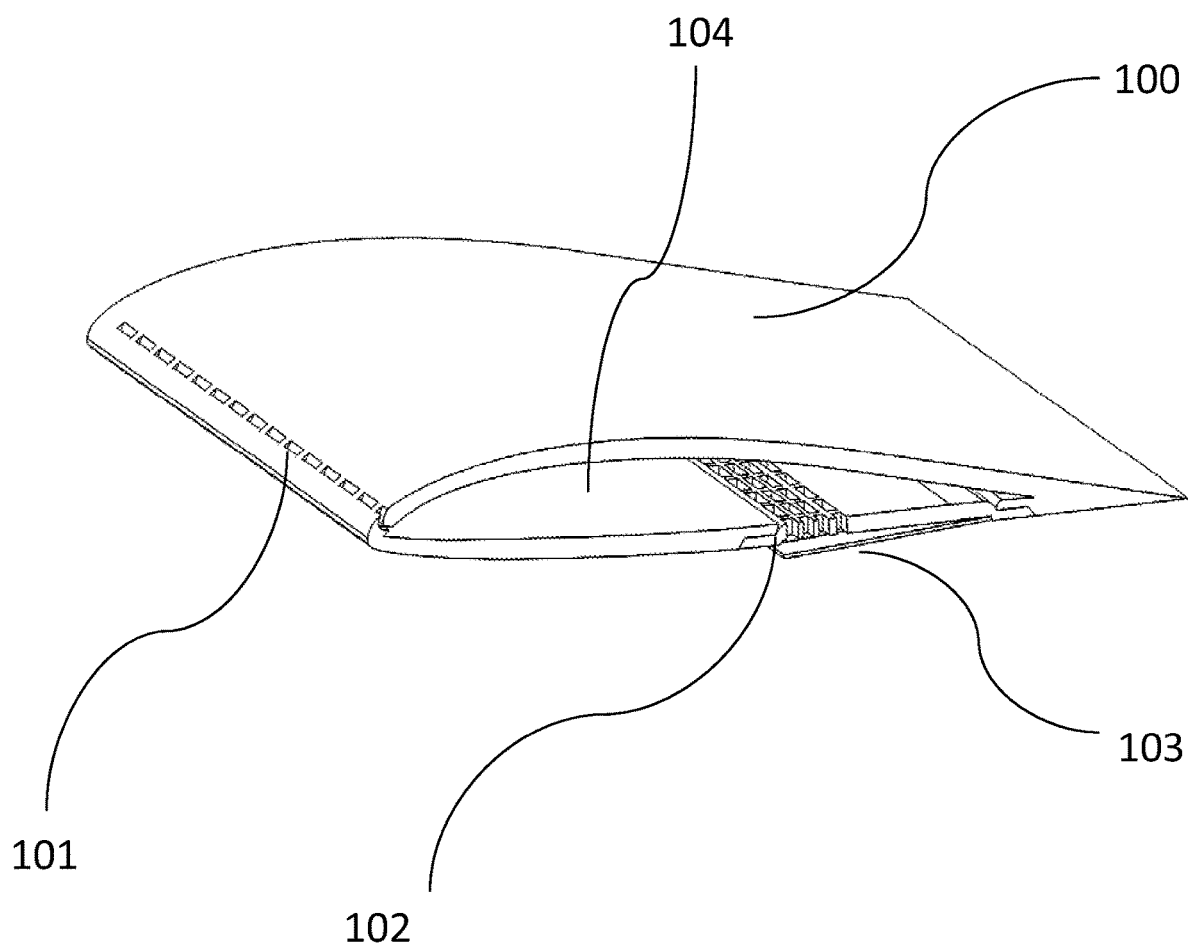
FIG. 1 provides a cross-sectional view of an airfoil employing the distributed active fluid bleed system.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

Generally, the present invention concerns a system and method for regulating and controlling distributed active fluid bleed. The present invention discloses a flow control and stabilization capabilities of distributed active bleed actuation.

When a fluid is in motion over a surface of a structure, the moving fluid or a crossflow causes a pressure distribution over the surface. Depending on the shape of the structure, local pressure of a certain region of the surface varies. The difference in the pressure distribution over the surface causes global aerodynamic or hydrodynamic forces and moments, such as lift, drag, pitching moment. Bleed is initiated when there is a flow circulation through the surface from high pressure to low pressure.

Traditionally, forces and moments around the structure in crossflow are altered or controlled by introducing a hard control surface to interact with the crossflow. The bleed, once actuated, interacts with the crossflow without introducing a hard control surface to the crossflow about the structure. Therefore, the bleed eliminates many restrictions and limits that a traditional hard control surface imposes with regard to the design of a structure, such as an aircraft.

Passive bleed refers to bleed that is invariant with time. The passive bleed cannot be altered or regulated, and as such changes in parameters of fluid such as pressure cannot be altered or regulated. On the contrary, regulating a bleed flow that interacts with the crossflow enables modification of parameters of fluid over the structure which leads to control of aerodynamic or hydrodynamic forces and moments of the structure. The present invention discloses a system and method of regulating and controlling bleed flow to modify various forces and moments in a crossflow over a structure exposed in a moving fluid.

The structure contemplated herein may be any structure of any material that is being placed in any type of fluid. Examples of structures contemplated herein may include, but are not limited to, aerodynamic structures, such as an airfoil, hydrodynamic structures, such as a hydrofoil, a building, a sail, or the like.

A distributed active fluid bleed system may comprise a structure with crossflow streaming around the structure. A bleed flow passage may be formed through the structure providing a passage for the crossflow to enter into the structure, thereby forming a bleed flow. The crossflow over the structure may initiate pressure differences across a surface of the structure which enables the bleed flow through the bleed flow passage. The bleed flow passage need not be limited to any size, shape, or form. The bleed passage may be any type of through-way that provides a passage for the bleed flow to pass through the structure.

In one embodiment, a bleed inlet may be formed on a surface of the structure to receive the crossflow to enter through the bleed flow passage. The bleed inlet may be positioned at a high pressure region of the crossflow about the structure.

In another embodiment, a bleed outlet may be formed on a surface of the structure to release the received crossflow from the bleed inlet through the bleed flow passage, into a lower pressure region of the crossflow. The bleed outlet may be positioned at the low pressure region of the crossflow.

The bleed flow introduced to the crossflow at the bleed outlet may modify pressure and direction of the crossflow. Similarly, pressure and direction of the crossflow at the bleed inlet also may be modified due to the bleed flow being drawn from the crossflow. In both cases, the modification in pressure and flow around the structure may lead to alteration of pressure distribution, aerodynamic forces, hydrodynamic forces, vorticity, or moments about the structure.

In one embodiment, an interaction between the bleed flow and the crossflow of the structure may alter effective stiffness, structural coupling, or damping properties of the structure.

In another embodiment, the bleed inlet may be constructed and positioned to modify pressure distribution, aerodynamic forces, hydrodynamic forces, vorticity, or moments of the crossflow about the structure.

In yet another embodiment, the bleed outlet may be constructed and positioned to modify pressure distribution, aerodynamic forces, hydrodynamic forces, vorticity, or moments of the crossflow about the structure.

In a further embodiment, the bleed flow may modify global forces about the structure and alter a shape of the structure. The structure may be elastic such that modification of global forces about the structure via the bleed flow alters the shape of the structure. The alteration of the shape of the structure may be employed to control a movement of the structure.

In a further embodiment, the bleed flow may modify global forces about the structure and alter a virtual shape of the structure. The crossflow wraps around the structure and a streamline of the crossflow is defined by the shape of the structure. Once the bleed flow is introduced to the crossflow, the modification applied to pressure and direction of the crossflow about the structure may alter the streamline of the crossflow. A sink may be formed near the bleed inlet where a suction force may alter the streamline. A source may be formed near the bled outlet where the streamline may be pushed away from its original path before the bleed flow is introduced.

Those of ordinary skill in the art will appreciate that the location and the number of the bleed inlets and bleed outlets may vary in order to make desired modification and alteration about the structure discussed above.

The structure may employ more than one of the bleed flow passages to introduce more than one bleed flow to the crossflow. A plurality of bleed inlets and bleed outlets may be distributed over the surface of the structure to enable any desired modification and alteration of pressure distribution, aerodynamic forces, hydrodynamic forces, vorticity, or moments, of the crossflow about the structure.

In one embodiment, the bleed flow may flow from a single bleed inlet and out to more than one bleed outlet.

In another embodiment, the bleed flow may flow from more than one bleed inlet and out to a single bleed outlet.

In yet another embodiment, a plurality of bleed flows may be formed from a plurality of bleed inlets to a plurality of bleed outlets.

In a further embodiment, the plurality of bleed inlets and bleed outlets may be distributed over the surface of the structure in a span-wise direction.

The distributed active fluid bleed system may further comprise an actuation mechanism and an actuator. The actuation mechanism may be coupled to the bleed inlet or outlet where the actuation mechanism allows the bleed flow passage to be open or closed. The actuator may be operatively coupled to the actuation mechanism to enable the actuation mechanism. By employing the actuation mechanism to selectively open or close the bleed inlet or outlet, the bleed flow may be regulated in a time-dependent fashion.

In one embodiment, the bleed inlet may be closed by the actuation mechanism, thereby preventing the bleed flow from being introduced to the crossflow.

In another embodiment, the bleed outlet may be closed by the actuation mechanism, thereby preventing the bleed flow from being introduced to the crossflow.

In yet another embodiment, the actuator may enable the actuation mechanism to be at an open position, a closed position, or any other positions therebetween. When the actuation mechanism is at the any other position therebetween, the variation in opening of the actuation mechanism may adjust the flow rate of the bleed flow which may affect modifying and altering the crossflow.

The actuation mechanism contemplated herein may be any mechanism that is capable of controlling the introduction of the bleed flow to the crossflow.

The actuators contemplated herein may include, but are not limited to, mechanical, electromechanical, electromagnetic, thermal, chemical, piezoelectric, shape memory alloy, pneumatic, hydraulic actuators, and the like. The actuators may be integrated into the surface of the structure or mounted within the structure.

Examples of the actuators and the actuation mechanisms may include, but are not limited to, mechanical means such as, linear rod-type actuators, sliding perforated plates, pneumatic actuators, inflatable or deformable bladders, etc. that open and close holes in the structure's surface with sufficient time-response to enable active bleed. Electromechanical actuators including, piezoelectric surfaces, reeds, linear drives, or stacks that generate mechanical force and displacement under applied voltage, electrostatic materials that deform in one or multiple dimensions in response to applied voltage, or otherwise "smart" materials or structures that operate with electric current to actuate. Similarly, electromagnets, which induce a magnetic field in response to an applied voltage, may or may not be combined with permanent magnets to control surface openings. Thermal actuators, such as shape memory alloy materials, such as, planar sheets or wires, or laminated metal, such as, clad or bimetal strips, which deform in a controllable manner in response to temperature differences which may be generated by electric current, may also be used as mechanisms to regulate bleed inlets and bleed outlets. Chemical actuators, similarly, can be designed to react in a controlled fashion to generate mechanical force, heat, or electric current or could be combined with the above methods to produce surface deflections or openings.

The distributed active fluid bleed system may further comprise a bleed control system operatively coupled to the actuator which regulates operation of the actuator.

A method of regulating the bleed flow to modify parameters of fluid in the crossflow over the structure is also disclosed. The method may utilize the distributed active fluid bleed system disclosed above. The bleed flow may be regulated to modify parameters of the crossflow over the structure.

The structure may define a bleed flow passage formed therein. The bleed flow passage may provide a passage where the bleed flow may circulate.

In one embodiment, the distributed active fluid bleed system may form a bleed inlet on a surface of the structure. The bleed inlet may be configured to receive the crossflow from a high pressure region in the pressure distribution about the crossflow. The crossflow may run through the bleed flow passage.

In another embodiment, the distributed active fluid bleed system may form a bleed outlet on a surface of the structure. The bleed outlet may be configured to release the received crossflow through the bleed flow passage, into a lower pressure region in the pressure distribution about the crossflow. Thus, the bleed flow circulates from the bleed inlet to the bleed outlet.

The distributed active fluid system may move an actuator mechanism to operate the bleed inlet and the bleed outlet. The actuation mechanism may channel the bleed flow through the bleed flow passage when the actuation mechanism is in an open position. Alternately, the actuation mechanism may prevent the bleed flow from channeling through the bleed flow passage when in a closed position. In one embodiment, the movement of the actuator mechanism may be controlled by an actuator.

The distributed active fluid system may modify the parameters of fluid in the crossflow over the structure by regulating the bleed flow. The parameters of fluid may include, but are not limited to, pressure distribution, aerodynamic forces, hydrodynamic forces, voracity, moment, pitching moment, and the like.

In one embodiment, the modification of the parameters of fluid in the crossflow may change a virtual shape of the structure by regulating the bleed flow. The sink may be formed near the bleed inlet altering pressure distribution and/or direction of the crossflow, thereby changing the virtual shape of the structure. Similarly, the source may be formed near the bleed outlet altering pressure distribution and/or direction of the crossflow. The sink and the source may further enable movement control of the structure by regulating the sink and the source, which may result from modifying the parameters of fluid in the crossflow.

In another embodiment, the modification of the parameters of fluid in the crossflow may also modify a shape of the structure. Such modification in the shape of the structure may enable movement control of the structure through the crossflow. When the bleed flow is introduced to the crossflow, an interaction between the two flows may be tailored to leverage generation and regulation of vorticity concentrations near the surface, such that the shape of the structure is modified. As a result, aerodynamic forces or hydrodynamic forces may be altered.

In yet another embodiment, the bleed flow may be regulated in one of the following manners: time-periodic, time-harmonic, arbitrary time-dependent, and time-variant. The regulation of bleed flow in such manners may be achieved through controlling the bleed inlets or outlets with the actuation mechanism, in an open position, a closed position, or any other positions therebetween. In one embodiment, a louver may be employed as the actuation mechanism. The displacement of the louver may vary with time, thus varying the rate of the bleed flow that flows through the bleed inlets or outlets controlled by the louver. The displacement of the louver may position the louver in an open position, a closed position, or any other positions therebetween. By regulating the bleed flow in such manner, the bleed flow may stabilize a dynamically pitching airfoil near stall angle.

By way of example, the bleed flow regulated in the time-harmonic manner may significantly affect formation and evolution of dynamic stall vortex, which, in turn, stabilizes the dynamically pitching airfoil or vibration of the structure.

In a further embodiment, the modification of the parameters of fluid may modify lift, drag, pitching moment, and yawing moment about the structure, thereby fulfilling the role of conventional moving control surfaces.

The regulation of bleed flow may further modify effective stiffness, structural coupling, and damping properties of the structure in the crossflow. Aeroelastic tailoring or spatially graded stiffness and compliance may be achieved by regulating the bleed flow. An aeroelastic vibration of the structure may be suppressed by regulating the bleed flow. For example, the aeroelastic vibration of an airfoil may be suppressed by varying the aerodynamic forces as a function of an elastic deflection to dampen structural dynamics of the surface.

In one embodiment, span wise distribution of the bleed inlets and/or bleed outlets may be employed to stabilize structural vibrations. The structure may form a plurality of bleed inlets and bleed outlets, distributed on the surface of the structure, where the regulation of bleed flow from each of the plurality of bleed inlets and bleed outlets may provide moment and forces for suppressing aeroelastic vibration.

Turning now to FIG. 1, a cross-sectional view of an airfoil is shown. FIG. 1 depicts an embodiment of the distributed active fluid bleed system described herein. In this exemplary figure, the distributed active fluid bleed system employs an airfoil 100 as the structure and the louver 103 as the actuation mechanism. The plurality of bleed inlets 102 are shown expanding along the airfoil in a span-wise direction along a surface of the airfoil. The plurality of bleed outlets 101 are positioned at the leading edge expanding in a span-wise direction on the surface of the airfoil. The louver 103 is shown in the open position; however, an actual working of the louver does not open in such an angle that disrupts the flow around the louver. The louver 103 shown in this figure is exemplified to show components of the present invention. The bleed flow is actuated when the crossflow enters into each of the plurality of bleed inlets 102 and exits out to each of the plurality of bleed outlets 101 through the bleed passage 104. In this embodiment, the airfoil has a higher pressure distribution at a pressure side (bottom of the airfoil) of the airfoil and a lower pressure distribution at a suction side (top of the airfoil).

Figure 2:
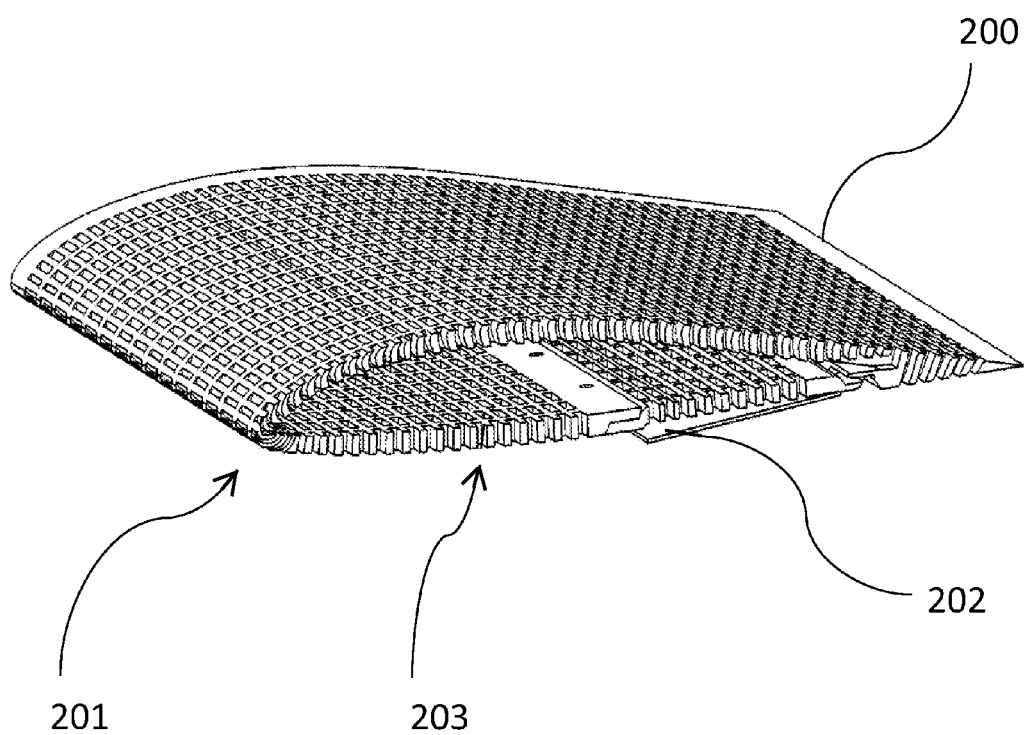
FIG. 2 provides an exemplary embodiment of an airfoil comprising a plurality of perforations throughout the surface of the airfoil.

FIG. 2 illustrates an exemplary embodiment of an airfoil comprising a plurality of perforations throughout the surface of the airfoil. In this embodiment, any perforations not covered by the louver 202 may be utilized as bleed inlets or outlets based on the pressure distribution around the airfoil. Each of the plurality of perforations 201 may be adapted to modify pressure distribution, aerodynamic forces, hydrodynamic forces, voracity, or moments, of the crossflow about the structure 200, when the bleed flow interacts with the crossflow. Accordingly, each of the plurality of perforations 201 may be sealed with a thin tape. The louver 202 is shown at the open position allowing the crossflow to enter into the plurality of bleed inlets positioned to be opened or closed by the louver 202. In this embodiment, the crossflow enters into the plurality of bleed inlets opened by the louver, which are the perforations closeable by the louver, and then exits out to the plurality of bleed outlets through the bleed passage 203. The bleed flow is circulated from the high pressure region to the low pressure region around the airfoil. In this particular embodiment, the bleed passage is a cavity defined by the airfoil.

Figure 3:
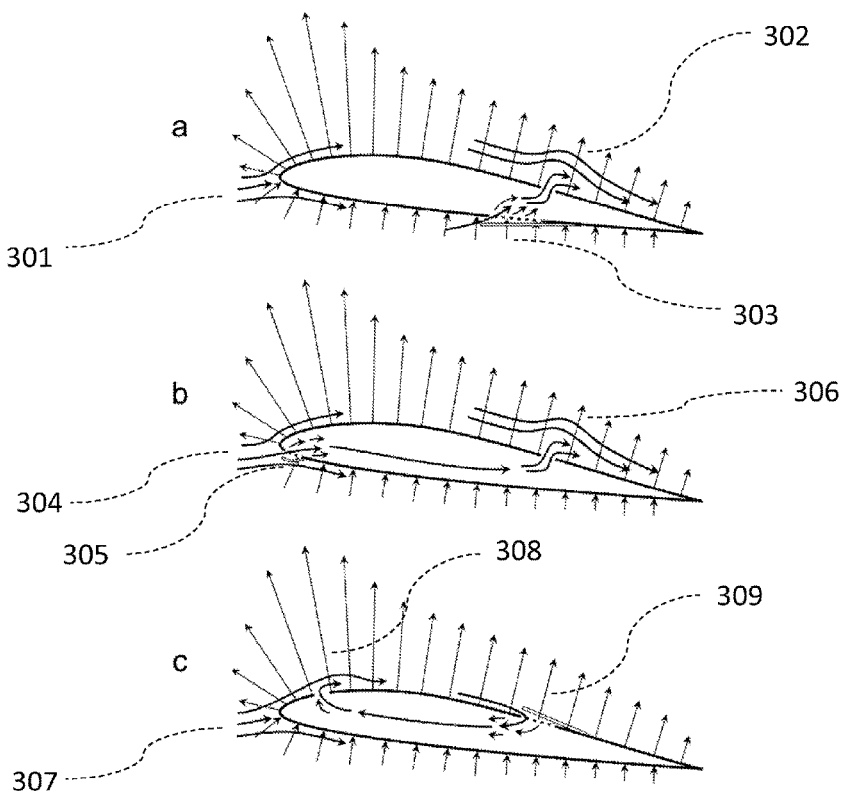
FIG. 3 provides schematic embodiments of the bleed flow being regulated at various locations of bleed inlets and bleed outlets formed on the surface of an airfoil.

FIG. 3 shows schematic embodiments of the bleed flow being regulated at various locations of bleed inlets and bleed outlets formed on the surface of an airfoil. The thin arrows indicate the pressure distribution of the airfoil in a moving fluid, such as air. In all three examples of FIG. 3, the bleed flow is initiated from receiving the crossflow from the high pressure region and releasing the bleed flow out to the low pressure region. In (a), the crossflow 301 enters the bleed flow passage through mounted louvers 303 near the trailing edge of the airfoil where the pressure is higher. The bleed flow exiting out 302 from the bleed flow passage interacts with the crossflow. An example of the source is shown at 302. As shown herein, the bleed flow exiting out 302 alters the direction of the crossflow at 302, which alters the virtual shape of the airfoil. In (b), the crossflow 304 enters through the louver 305 near the leading edge of the airfoil, the crossflow passes through the plenum, and exits 306 near the trailing edge on the suction side of the airfoil. Thereby, actuating the bleed flow. FIG. 3(*c*) shows an example of the bleed flow being actuated on one side of the airfoil, the crossflow 307 passes from a region of relatively high pressure 309 on the suction side through the louvers to a region of lower pressure 308 near the leading edge suction side. This embodiment of the bleed flow may alter the vorticity formed on the suction side of the airfoil.

Figure 4:
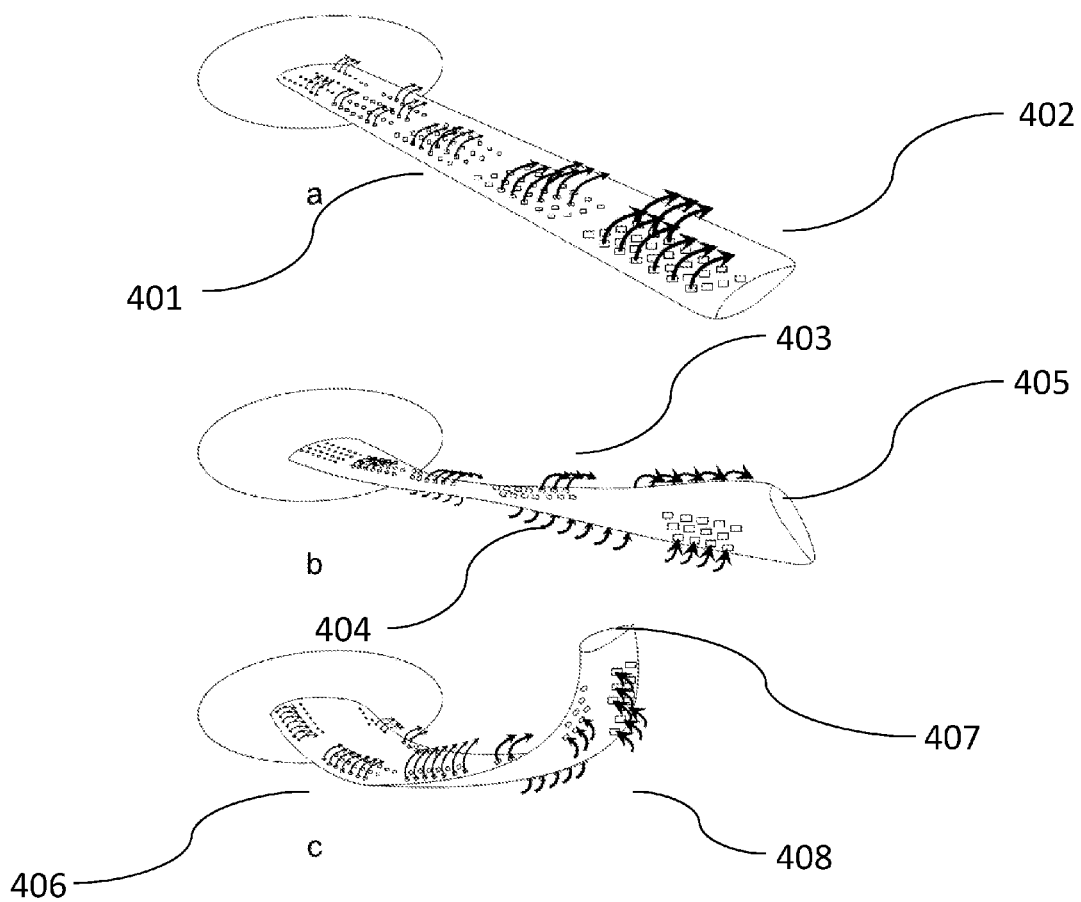
FIG. 4 provides exemplary embodiments of changes in the shape of the structure due to regulation of the bleed flow.

FIG. 4 presents exemplary embodiments of changes in the shape of the structure due to regulation of the bleed flow. FIG. 4(*a*) shows a schematic rendition of bleed flow exiting out of the plurality of bleed outlets 401 over a wing 402. When the bleed flow exits out to the crossflow, an interaction between the bleed flow and the crossflow generates vorticity concentrations near the surface of the wing. Once the vorticity is regulated, the shape of the wing can be modified. FIG. 4(*b*) shows a torsional modification in the shape of the wing 405. The bleed inlets 404 and bleed outlets 403 are shown. FIG. 4(*c*) shows a bending in the shape of the wing 407. The bleed inlets 408 and bleed outlets 406 are shown.

The following experimental results show exemplary method and system of regulating bleed flow over a structure to modify parameters of fluid in the crossflow. In this particular experiment, a piezoelectric actuator is employed on an airfoil with a louver as the actuation mechanism. The effect of the system and method of regulating the bleed flow are being presented as way of examples, and do not limit the scope of the present disclosure. Those of ordinary skill in the art will appreciate that the experimental results shown below serve to demonstrate the system and method for the distributed active fluid bleed system disclosed herein.

Figure 5:
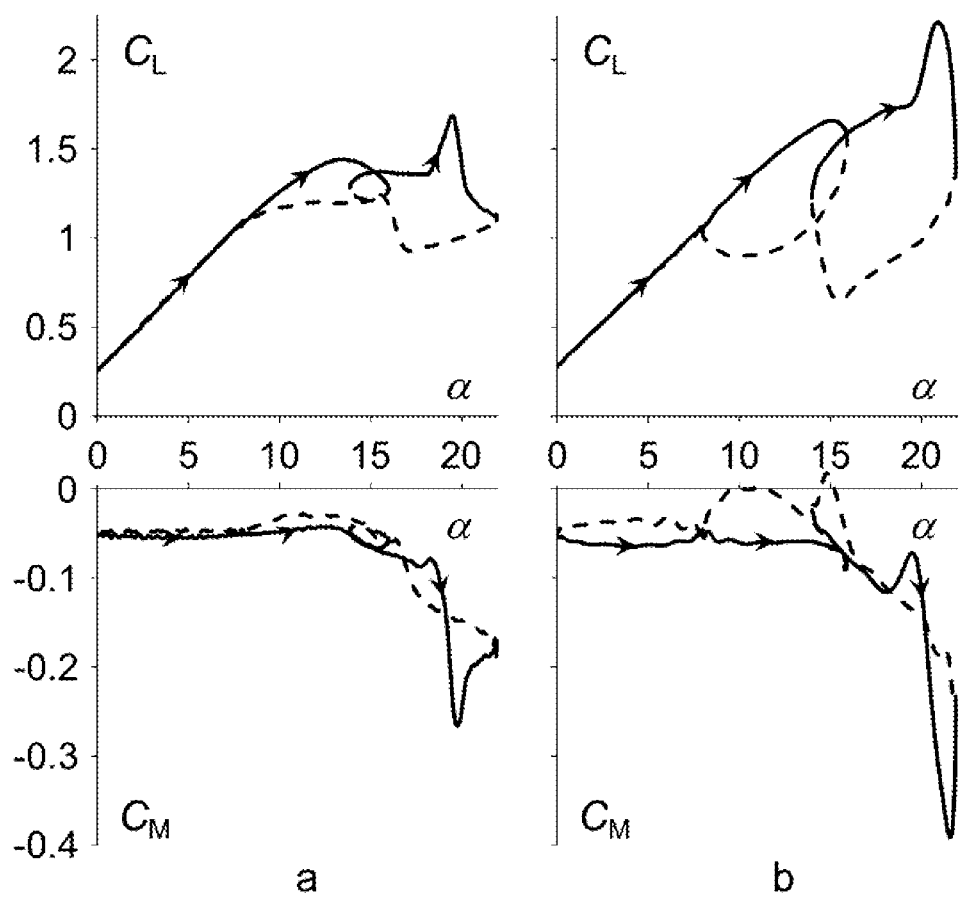
FIG. 5 provides plots describing the variation of lift coefficient and pitching moment coefficient during the time-harmonic pitching cycle.

FIG. 5 presents an experimental result showing variation of lift coefficient ($C_L$) and pitching moment coefficient ($C_M$) of an airfoil during a time-harmonic pitching cycle. When the airfoil undergoes the time-harmonic pitching cycle through its static stall angle, a crossflow is dominated by dynamic stall that is characterized by an increase in the stall angle and an accumulation of a vorticity concentration near the leading edge of the airfoil during the airfoil's upstroke. When the dynamic stall angle is exceeded, the crossflow separates from the trailing edge and migrates upstream along the airfoil's surface. Also, when the dynamic stall angle is exceeded, the leading edge vortex is advected downstream, momentarily augmenting lift and inducing a nose-down pitching moment. As a result, negative damping is produced during the time-harmonic pitching cycle, leading to excessive torsional loading.

FIG. 5(*a*) shows plots describing the variation of lift coefficient $C_L$ and pitching moment coefficient CM during the time-harmonic pitching cycle at a "low" (k=0.04) pitching frequency (k). FIG. 5(*b*) shows the variation of $C_L$ and $C_M$ during the time-harmonic pitching cycle at "high" (k=0.17) pitching frequency. The arrow indicates upstroke motion of the airfoil and the dashed lines indicate downstroke motion of the airfoil. Hysteretic effects on the airfoil at low angles of attack (α, measured in degrees) are minimal at both frequencies "low" and "high", and $C_L$ varies linearly with angle of attack from 0 to 9. However, in the intermediate range of angles of attack, from 8 to 16, hysteretic effects become more pronounced and considerably stronger at k=0.17, including an increase in the maximum lift where the static levels of $C_L$ are not recovered until pre-stall α is reached at the bottom of the time-harmonic pitch cycle. The effects of the hysteresis are even more pronounced in the range of α between 14 and 22. At both k=0.04 and 0.17, buildup of the dynamic stall vortex on the leading edge during the upstroke continues until α=20, leading to lift levels (Maximum $C_L$=1.69 and 2.21, respectively) that exceed the maximum static level by 60% and 110%, respectively. As the downstroke commences and the dynamic stall vortex is shed, the airfoil enters deep stall, reaching minimum $C_L$ of 0.93 (at α=17.2), and minimum of 0.65 (at α=15.4), respectively.

The hysteresis associated with dynamic stall vortex in FIGS. 5(*a*) and (*b*) is manifested in the cycle traces of $C_M(α)$ by a sharp nose-down pitching moment when the vortex is shed. The hysteresis in unsteady separation and reattachment can lead to oscillatory flutter motion with negative damping during which the airfoil extracts energy from the flow, and the pitch oscillations can increase in amplitude. The direction of motion along a closed trace of $C_M(\alpha)$ indicates whether $C_M$ acts to dampen or reinforce the airfoil's motion. Negative damping is observed when the direction of the $C_M(\alpha)$ enclosure is clockwise. As shown in FIGS. 5(a) and (b), the traces of $C_M(\alpha)$ for both k=0.04 and 0.17 exhibit negative pitch damping (during 16.9<α<19.5 and 18.5<α<20.3).

Figure 6:
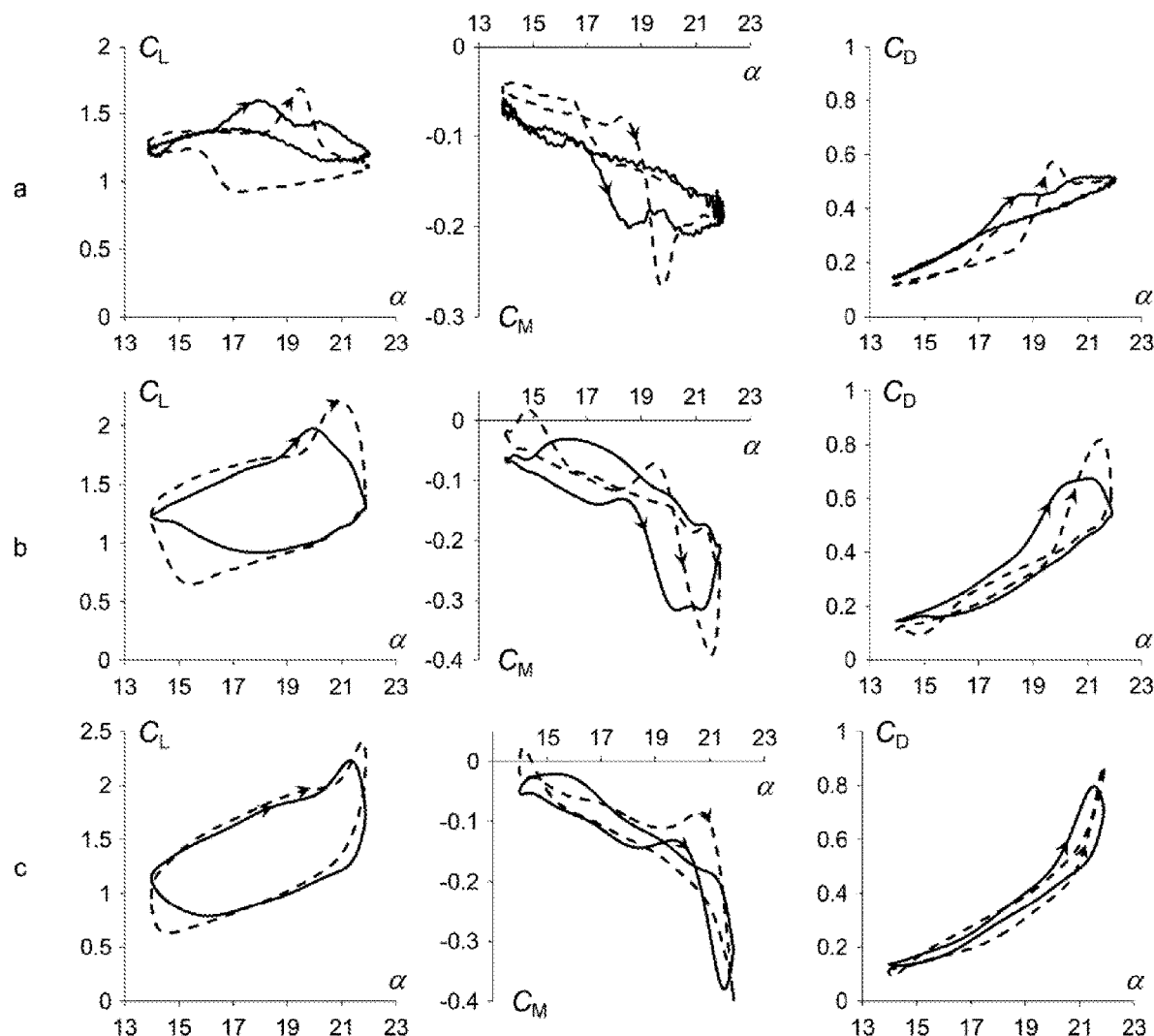
FIG. 6 provides an experimental results demonstrating effect of time-harmonic bleed regulation on dynamically pitching airfoil.

FIG. 6 shows an experimental results demonstrating the effect of time-harmonic bleed regulation on dynamically pitching airfoil. The plots in FIG. 6 show variation of $C_L(\alpha)$, $C_M(\alpha)$, and $C_D(\alpha)$ for the airfoil without the bleed flow in dashed lines compared to variation of $C_L(\alpha)$, $C_M(\alpha)$, and $C_D(\alpha)$ for the airfoil with regulated bleed flow in solid lines during a time-harmonic pitching cycle. The bleed flow affects the parameters of the crossflow during the airfoil's pitch cycle. FIGS. 6(a) through (c) show traces of $C_L(\alpha)$, $C_M(\alpha)$, and $C_D(\alpha)$ that were measured phase-locked to the motion of the airfoil at the angle of attack α, from 14 and 22, and at three frequencies (k), k=0.04, 0.17, and 0.25, respectively. Hysteresis is present even at low frequencies and worsens as the frequency increases. With the bleed flow actuated, in FIG. 6(a), with k=0.04, the bleed flow reduces the hysteresis and increases the lift coefficient ($C_L$) while it also appears to mitigate the effects of the dynamic stall vortex, when compared to the airfoil without the actuation of bleed flow. In addition, the negative damping during pitch (16.9<α<19.5) is completely removed, and the magnitude of the pitch down moment that is associated with the shedding of the dynamic stall vortex is significantly reduced. These effects are accompanied by a small increase in drag (which is partly lift-induced). As the frequency, k, increases, in FIGS. 6(b) and (c), the effects of bleed actuation on the lift coefficient ($C_L$) diminishes. The bleed flow still affects the formation and shedding of the dynamic stall vortex, in particular, the bleed flow appears to reduce the momentary increase in lift during its shedding along with some reduction in the extent of the hysteresis towards the end of the pitch down segment of the pitching cycle. The bleed flow affects the pitching moment, $C_M$, in the crossflow. At k=0.17 (FIG. 6(b)) and k=0.25 (FIG. 6(c)), the bleed flow eliminates the negative damping, compared to the airfoil without out the bleed flow actuated. This can be seen in, 18.5°<α<20.3° when k=0.17 in FIG. 6(b) and 14.9°<α<22° when k=0.25 in FIG. 6(c).

Figure 7:
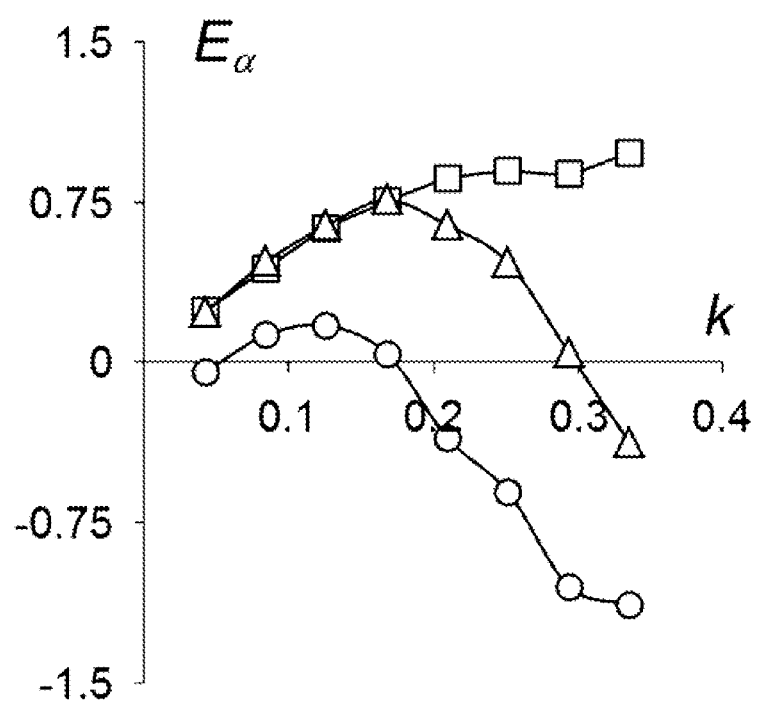
FIG. 7 provides an experimental result showing the effect of time-harmonic bleed flow on aerodynamic damping coefficient of the airfoil.

FIG. 7 shows an experimental result showing the effect of time-harmonic bleed flow on an aerodynamic damping coefficient of the airfoil. The aerodynamic damping coefficient (Eα) is an integrated measure of pitch stability of the airfoil. An aerodynamic coefficient greater than zero indicates suppressive pitch damping. Time-harmonic bleed flow affects the formation and evolution of dynamic stall vortex. In turn, it affects the pitching stability of the airfoil. The experimental results shown in FIG. 7 plot variations of the aerodynamic damping coefficient with angle of attack α, ranging from 14 to 22. The plot with circles shows the experimental result obtained from the airfoil without the bleed flow actuation, the plot with triangles is obtained from the airfoil with the bleed flow regulated in time-periodic manner, and the plot with squares is obtained from the airfoil with time-invariant bleed flow. The airfoil without the bleed flow becomes unstable in pitch, Eα<0, by a pitching frequency, k, of 0.2. On the other hand, the airfoil, with bleed flow actuated continuously, becomes unstable in pitch, Eα<0, once the frequency, k, reaches 0.28, providing more stability than the airfoil without the bleed flow. The airfoil with time-invariant bleed flow stays stable in pitch, Eα>0, over the range of pitching frequencies presented in FIG. 7. The suppressive pitch damping is achieved for the airfoil in the presence of time-periodic bleed flow regulation.

Figure 8:
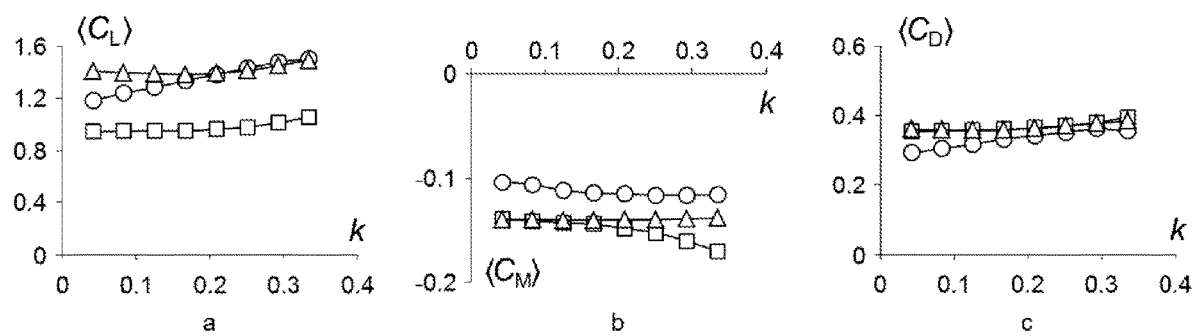
FIG. 8 provides an experimental result showing the effect of time-harmonic bleed flow on aerodynamic forces around the airfoil.

FIG. 8 shows an experimental result showing the effect of bleed flow actuation on aerodynamic forces around the airfoil. The variation of the cycle-averaged $C_L$, $C_M$, and $C_D$ with frequency, k, is shown for the airfoil without the bleed flow (the plot with circles), with time-invariant bleed flow (the plot with squares), and in the presence of time-harmonic bleed flow over the airfoil (the plot with triangles). The experiment is conducted under angle of attack in the range between 14 and 22. For k<0.2, the $C_L$ induced by the time-harmonic bleed flow of the airfoil is higher than that by the airfoil without the bleed flow. It is shown that the cycle-averaged $C_D$ is almost unchanged in the presence of bleed flow compared to without the bleed flow. This demonstrates that the bleed flow actuated airfoil does not increase drag.

Figure 9:
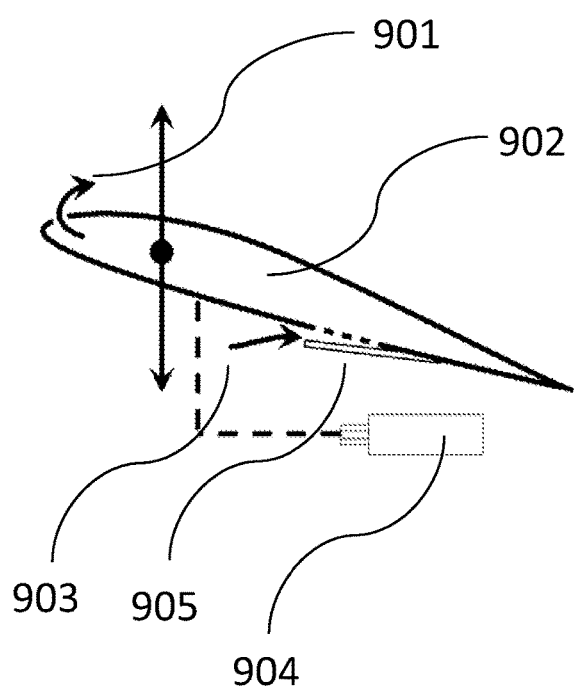
FIG. 9 provides a schematic representation of an experimental procedure to demonstrate aeroelastic vibration suppression.
Figure 9:
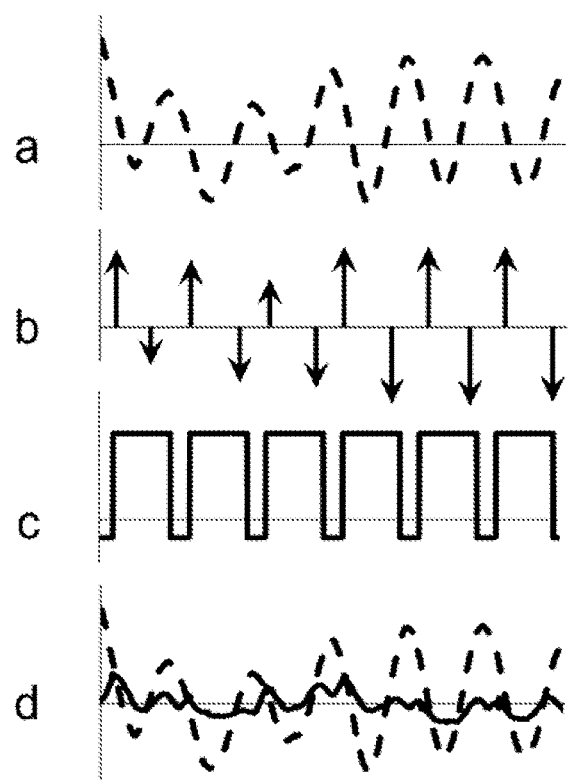

FIG. 9 illustrates a schematic representation of an experimental procedure to demonstrate aeroelastic vibration suppression of the airfoil by regulating the bleed flow. Regulating the bleed flow by distributing the bleed inlets and outlets span wise over the airfoil stabilizes aeroelastic vibration that may be caused due to periodic vortex shedding. The airfoil 902 with compliant end conditions is forced to vibrate periodically in the crossflow, simulating aeroelastic vibration, and its position is tracked using a laser vibrometer 904. The bleed inlet 903 intakes the crossflow flowing into the opened louver 905. FIG. 9 shows the sequence of steps that are taken to suppress the airfoil's aeroelastic vibration. In FIG. 9(a), an example of the time trace of the vibrometer's acceleration output is presented. Desired increments in lift force that are needed to stabilize the aeroelastic vibration are shown in FIG. 9(b). Then, a control signal for actuating the louver, which regulates the bleed flow, to induce the desired increments in lift force are shown in FIG. 9(c). The increments in lift force are induced by the interactions between the bleed flow and the crossflow over the airfoil. The opening of the louver may vary with angle of attack of the airfoil. Finally, FIG. 9(d) demonstrates the time trace of suppressed aeroelastic vibration of the airfoil as measured by the vibrometer in solid line. By regulating the bleed flow to modify lift forces on the vibrating airfoil, the aeroelastic vibration (shown in FIG. 9(d) in dashed lines) is suppressed.

Figure 10:
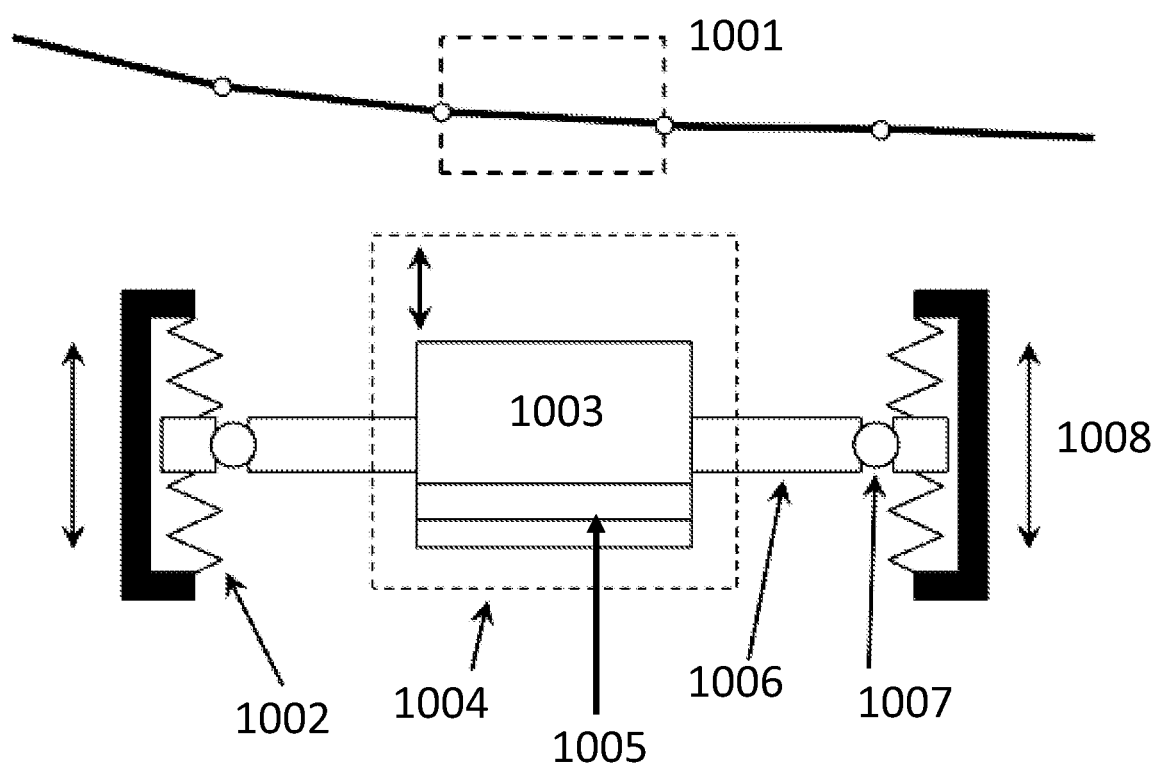
FIG. 10 provides an experimental set-up to demonstrate effect of bleed flow regulation for suppressing aeroelastic vibrational modes.

FIG. 10 shows an experimental set-up to demonstrate effect of bleed flow regulation for suppressing aeroelastic vibrational modes. The experimental set-up, AESim, is designed to provide, replicate and transmit desired, time-dependent increments in forces and moments at each end of the airfoil segment 1001 that is suspended and spans the wind tunnel's test section 1004. The airfoil segment 1001 is integrated with an array of distributed bleed actuators 1005 whose interaction with the crossflow in the wind tunnel provides aerodynamic moments and forces for suppressing aeroelastic vibrational modes that are simulated by AESim. The airfoil model 1003 is placed in the wind tunnel section 1004 with the bleed actuators 1005. Each end of the airfoil model 1003 is extended by lateral compliance 1006 and suspended by a spring 1002 by the root hinge 1007 to simulate aeroelastic vibration 1008. The resonance characteristics of AESim may be tuned by adjusting the springs or modifying the airfoil model's mass distribution. In the present experiments, the simulated aeroelastic vibration on both sides of the lateral compliances is driven synchronously in a given time-harmonic trajectory at a desired frequency.

The bleed actuators are then activated in open loop and are used to suppress aeroelastic vibration through the springs.

Figure 11:
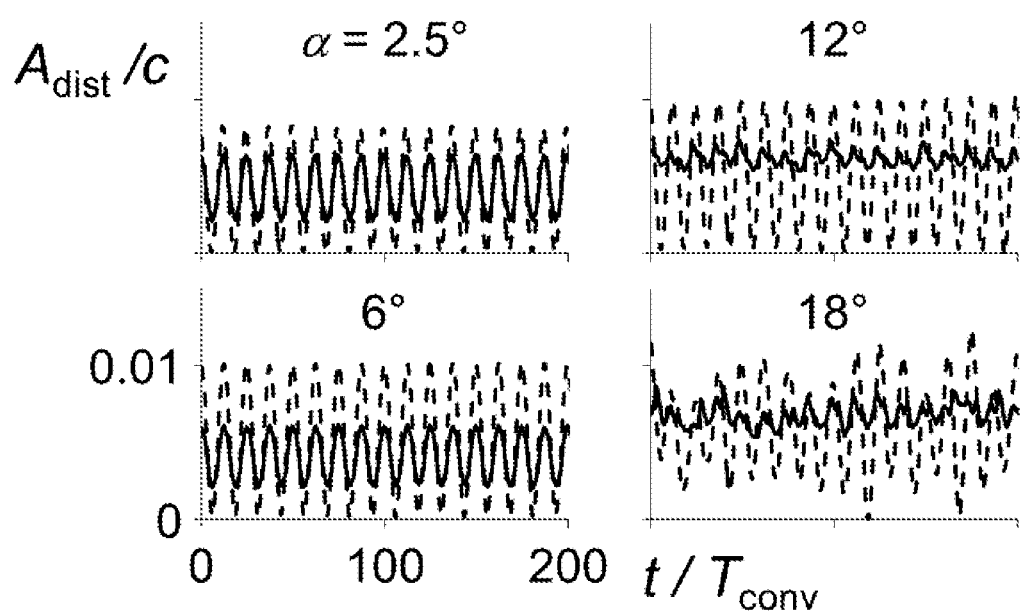
FIG. 11 provides an experimental result demonstrating variations of the airfoil's displacements with the bleed flow regulated in time periodic manner and the bleed flow disabled.

FIG. 11 illustrates an experimental result demonstrating variations of the airfoil's displacements with the bleed flow regulated in a time periodic manner and the bleed flow disabled. This experiment is conducted with angle of attack of the airfoil in 2.5, 6, 12, and 18 degrees utilizing the experimental set-up shown in FIG. 10. The solid lines show the airfoil with bleed flow regulated and the dashed lines show the airfoil with bleed flow disabled. The airfoil is dynamically vibrated at the frequency of 5 Hz. A bleed inlet is formed at the pressure side of the airfoil near the trailing edge and two bleed outlets are formed on the suction side of the airfoil, one near the leading edge and another near the trailing edge.

At the angle of attack of 6 degrees, the displacement is normalized by the airfoil's chord ($A_{dist}/c$) and reaches about 1% at angle of attacks 6 degrees and 12 degrees. The bleed flow suppresses the vibration of the airfoil over a wide range of angles of attacks. At low to moderate (i.e. pre-stall) angle of attack 2.5 degrees, the effect of an harmonic unsteady aerodynamic loading that causes the vibration on the airfoil is minimal, and the time periodic bleed flow regulation in this regime diminishes the magnitude of the airfoil's displacement, without significantly altering the characteristic period or phase of the vibration indicating that the suction side boundary layer is stable and the bleed flow merely changes the virtual shape of the airfoil and does not trigger flow instabilities. In the presence of the regulated bleed flow, the reduction in the displacement amplitude of the airfoil's motion at angle of attacks 2.5 degrees, 6 degrees, and 12 degrees is approximately 40%, 60%, and 88%, respectively. Despite irregular motion at post-stall angle of attack, 18 degrees, the regulated bleed flow reduces the amplitude of the displacement by nearly 75%. Thus, regulating the bleed flow, with distributed bleed inlets and bleed outlets, can be employed to control the dynamic modes of a flexible lifting surface (e.g., a flexible wing) in displacement, bending, and twisting of the airfoil, as previously demonstrated in FIG. 4.

Figure 12:
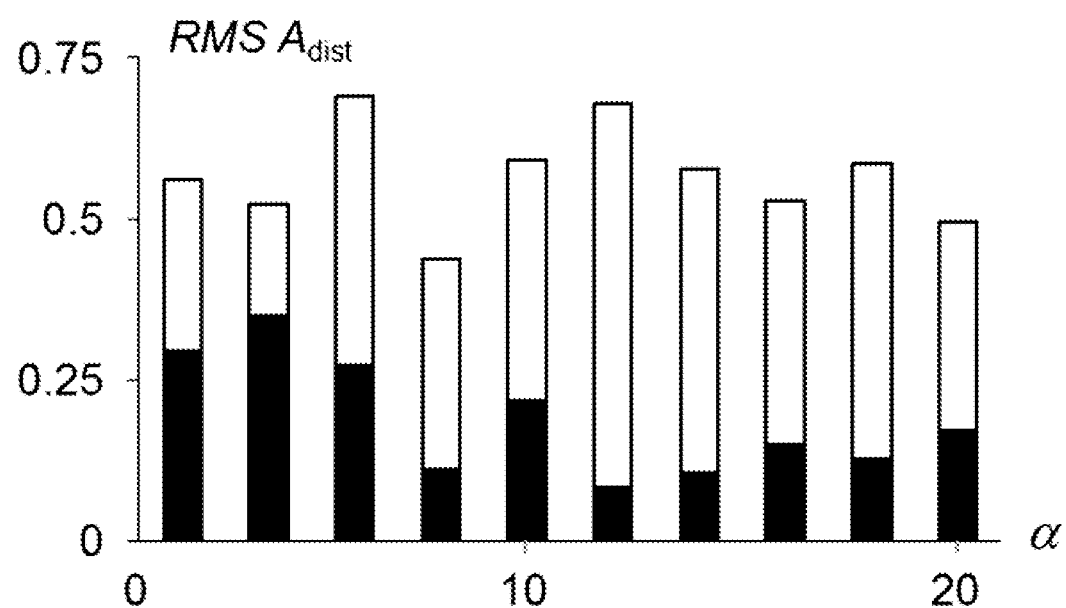
FIG. 12 provides an experimental result presenting root-mean-square (RMS) fluctuations of the airfoil with absence and presence of the bleed flow.

FIG. 12 shows an experimental result presenting root-mean-square (RMS) fluctuations of the airfoil with absence and presence of the bleed flow, with varying angles of attack. This figure demonstrates that the bleed flow attenuates the RMS of the airfoil's displacement amplitude by 30-50% at low angles of attack, and by more than 70% for most high angles of attack. The figure plots the data resulted from absence of the bleed flow in white, and presence of the bleed flow in black.

Figure 13:
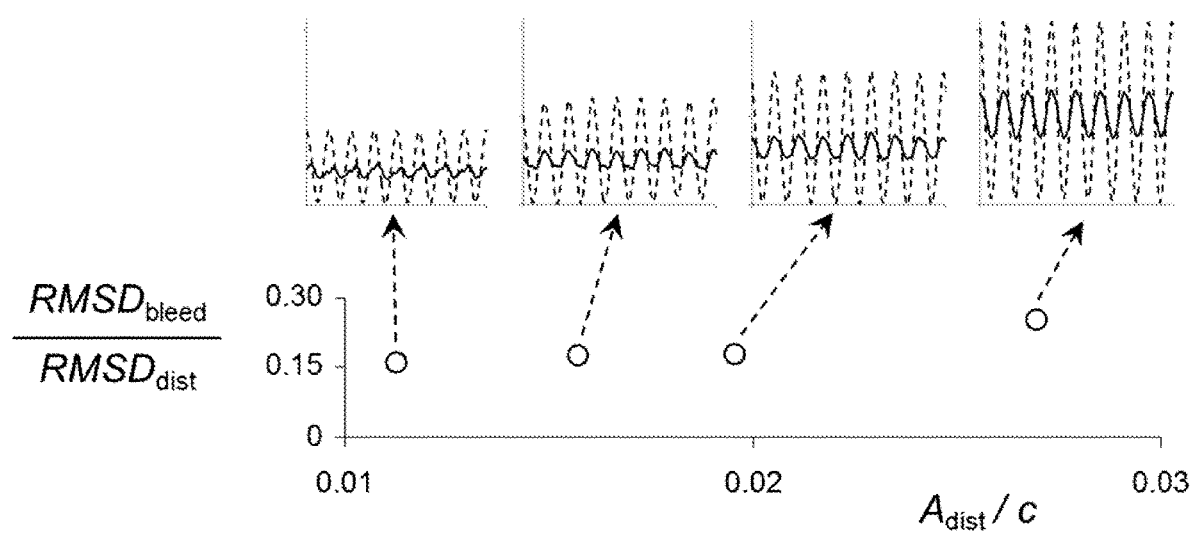
FIG. 13 provides an experimental result showing variation of disturbance attenuation with excitation amplitude for angle of attack at 11 degrees in the absence and presence of the bleed flow regulation.

FIG. 13 demonstrates an experimental result showing variation of disturbance attenuation with excitation amplitude for angle of attack at 11 degrees in the absence and presence of the bleed flow regulation. Because the bleed flow leverages the difference in local pressure between bleed inlets and outlets, the ability of bleed flow actuation to suppress disturbances can increase with the magnitude of the disturbance, which alters the pressure distributions on the airfoil surface near the bleed inlets and outlets. The effect of an increase in the disturbance amplitude is observed, which is accomplished in the experimental setup described in FIG. 10. The ratio of disturbance amplitudes in the presence and absence of bleed flow regulation remains nearly invariant throughout, and increases by about 30% when oscillations become large ($A_{dist}/c=0.028$).

Figure 14:
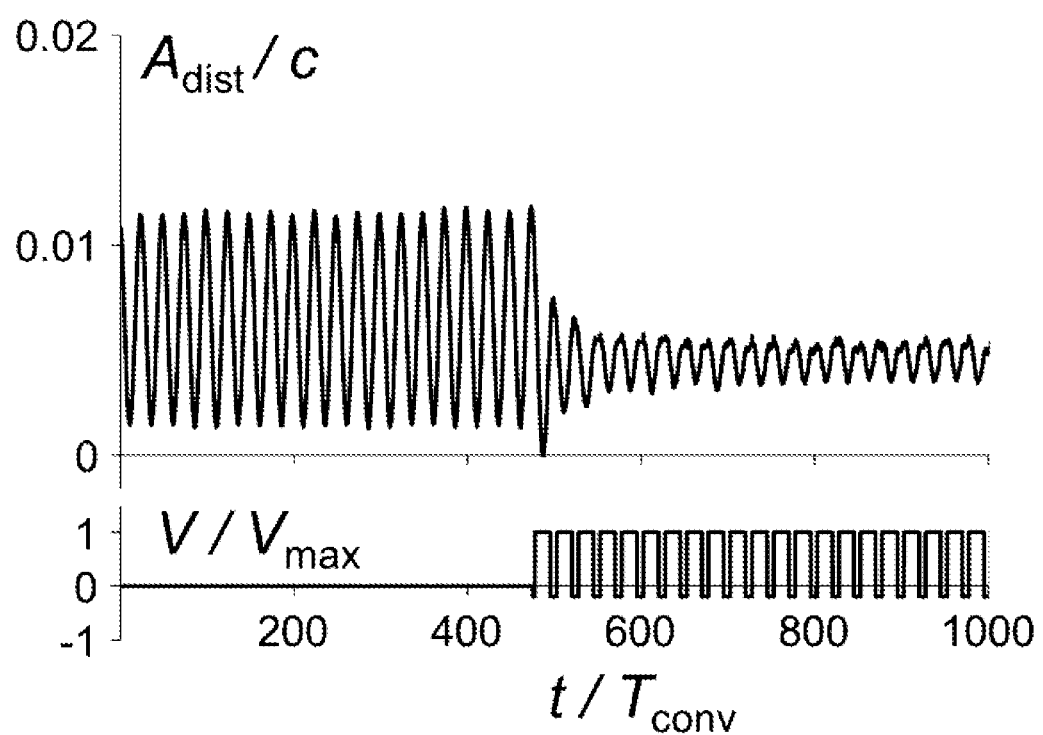
FIG. 14 provides an experimental result showing the response time of the airfoil to the initiation of the bleed flow regulation.

FIG. 14 presents an experimental result showing the response time of the airfoil to the initiation of bleed flow regulation. The bleed flow actuation is shown in the bottom plot of FIG. 14. The demonstration was conducted utilizing the experimental set-up shown in FIG. 10. This allows for an estimate of the transitory response time of the disturbance oscillation to the suppression of the vibration occurring on the airfoil. The response time includes the effects of the crossflow about the airfoil and the mechanical response of the AESim. FIG. 14 shows that the airfoil reacts to the bleed within one cycle (25 $T_{conv}$), and the characteristic response time for damping is approximately 2-3 oscillation cycles, or about 400-600 ms.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A distributed active fluid bleed system for regulating a bleed flow to modify parameters of crossflow over surfaces of an airfoil subject to a pressure distribution, the surfaces of the airfoil including an upper surface and a lower surface, the upper and lower surfaces meeting at a leading edge of the airfoil and a trailing edge of the airfoil, the surfaces defining a contiguous internal volume of the airfoil, the distributed active fluid bleed system comprising:
 perforations distributed over a majority of the surfaces of the airfoil and in fluidic communication with the contiguous internal volume; and
 a perforation mechanism controlling the availability of the perforations to fluidic communication between the contiguous internal volume and outside the airfoil;
 wherein the contiguous internal volume is common to all perforations and capable of providing nondeterministic fluidic communication between any configuration of perforations depending on:
  an availability of the perforations to fluidic communication via the perforation mechanism; and
  the pressure distribution about the airfoil;
 wherein each perforation is reconfigurable, and if available to fluidic communication, capable of performing as both an inlet perforation and an outlet perforation at different times;
 wherein a perforation performs as an inlet perforation when the perforation is available for fluidic communication and the pressure distribution about the airfoil is such that the perforation is subject to a surface pressure enabling fluidic flow from outside the airfoil into the contiguous internal volume;
 wherein a perforation performs as an outlet perforation when the perforation is available for fluidic communication and the pressure distribution about the airfoil is such that the perforation is subject to a surface pressure enabling fluidic flow from the contiguous internal volume to outside the airfoil;
 wherein at least a portion of the crossflow enters the contiguous internal volume through at least a portion of the inlet perforations, and exits the contiguous internal volume through at least a portion of the outlet perforations, forming the bleed flow; and
 wherein the perforation mechanism comprises:
  a non-cyclic sealing system; and
  a cyclic sealing system;
  wherein at least a portion of the perforations are entirely unavailable to fluidic communication between the contiguous internal volume and outside the airfoil at locations of the non-cyclic sealing system; and wherein the cyclic sealing system is operable between an open cycle and a closed cycle, wherein at least a portion of the perforations are entirely unavailable to fluidic communication between the contiguous internal volume and outside the airfoil at locations of the cyclic sealing system only when the cyclic sealing system is in the closed cycle.

2. The distributed active fluid bleed system of claim 1, wherein the airfoil is made of elastic material.

3. The distributed active fluid bleed system of claim 1, wherein the bleed flow is regulated to modify at least one of a virtual shape and a shape of the airfoil.

4. The distributed active fluid bleed system of claim 1, wherein the airfoil has a maximum thickness measured perpendicular to a mean camber line of the airfoil; and wherein perforations are distributed over the entirety of the surfaces of the airfoil from the leading edge to points of maximum thickness located on the upper and lower surfaces of the airfoil.

5. The distributed active fluid bleed system of claim 1, wherein perforations are distributed over the entirety of the upper surface of the airfoil.

6. The distributed active fluid bleed system of claim 1, wherein perforations are distributed over the entirety of the leading edge of the airfoil.

7. The distributed active fluid bleed system of claim 1, wherein perforations are configurable to modify one or more of pressure distribution, aerodynamic forces, hydrodynamic forces, voracity, or moments, of the crossflow about the airfoil when the bleed flow interacts with the crossflow.

8. The distributed active fluid bleed system of claim 1, wherein the cyclic sealing system comprises a louver hingedly affixed to the lower surface of the airfoil.

9. The distributed active fluid bleed system of claim 1, wherein the non-cyclic sealing system comprises sealing tape.

10. The distributed active fluid bleed system of claim 1 further comprising:

an actuator operatively coupled to the perforation mechanism; and a controller for regulating the actuator;

wherein the actuator is configured to move the perforation mechanism between the open cycle, the closed cycle, and positions therebetween.

11. The distributed active fluid bleed system of claim 10, wherein the controller regulates the actuator time-harmonically.

12. The distributed active fluid bleed system of claim 10, wherein the actuator is selected from the group consisting of a mechanical actuator, electromechanical actuator, electromagnetic actuator, thermal actuator, and chemical actuator.

13. The distributed active fluid bleed system of claim 10, wherein the controller regulates the actuator in a time-dependent manner selected from the group consisting of time-periodically, time-harmonically, and using an arbitrary time-dependence.

14. A distributed active fluid bleed system for regulating a bleed flow to modify parameters of crossflow over surfaces of an airfoil subject to a pressure distribution, the surfaces of the airfoil including an upper surface and a lower surface, the upper and lower surfaces meeting at a leading edge of the airfoil and a trailing edge of the airfoil, the surfaces defining a contiguous internal volume of the airfoil, the distributed active fluid bleed system comprising:

perforations distributed over the airfoil and in fluidic communication with the contiguous internal volume;

a perforation mechanism controlling an availability of the perforations to fluidic communication between the contiguous internal volume and outside the airfoil;

an actuator operatively coupled to the perforation mechanism; and a controller for regulating the actuator;

wherein the contiguous internal volume is common to all perforations and capable of providing nondeterministic fluidic communication between any configuration of perforations depending on:

the availability of the perforations to fluidic communication via the perforation mechanism; and the pressure distribution about the airfoil;

wherein a perforation is reconfigurable, and if available to fluidic communication, capable of performing as both an inlet perforation and an outlet perforation at different times;

wherein a perforation performs as an inlet perforation when the perforation is available for fluidic communication and the pressure distribution about the airfoil is such that the perforation is subject to a surface pressure enabling fluidic flow from outside the airfoil into the contiguous internal volume;

wherein a perforation performs as an outlet perforation when the perforation is available for fluidic communication and the pressure distribution about the airfoil is such that the perforation is subject to a surface pressure enabling fluidic flow from the contiguous internal volume to outside the airfoil;

wherein at least a portion of the crossflow enters the contiguous internal volume through at least a portion of the inlet perforations, and exits the contiguous internal volume through at least a portion of the outlet perforations, forming the bleed flow;

wherein the perforation mechanism comprises a cyclic sealing system operable between an open cycle and a closed cycle;

wherein the cyclic sealing system seals at least a portion of the perforations when in the closed cycle, making them entirely unavailable to fluidic communication when in the closed cycle; and wherein the actuator is configured to move the perforation mechanism between the open cycle, the closed cycle, and positions therebetween.

15. The distributed active fluid bleed system of claim 14, wherein the controller regulates the actuator time-harmonically.

16. The distributed active fluid bleed system of claim 14, wherein the actuator is selected from the group consisting of a mechanical actuator, electromechanical actuator, electromagnetic actuator, thermal actuator, and chemical actuator.

17. The distributed active fluid bleed system of claim 14, wherein the perforation mechanism further comprises a non-cyclic sealing system;

wherein at least a portion of the perforations are entirely unavailable to fluidic communication between the contiguous internal volume and the outside the airfoil at locations of the non-cyclic sealing system.

18. The distributed active fluid bleed system of claim 17, wherein the non-cyclic sealing system comprises sealing tape.

19. The distributed active fluid bleed system of claim 14, wherein the controller regulates the actuator in a time-dependent manner selected from the group consisting of time-periodically, time-harmonically, and using an arbitrary time-dependence.

20. The distributed active fluid bleed system of claim 14, wherein the airfoil is made of elastic material.

21. The distributed active fluid bleed system of claim 14, wherein the bleed flow is regulated to modify at least one of a virtual shape and a shape of the airfoil.

22. The distributed active fluid bleed system of claim 14, wherein the airfoil has a maximum thickness measured perpendicular to a mean camber line of the airfoil; and
   wherein perforations are distributed over the entirety of the surfaces of the airfoil from the leading edge to points of maximum thickness located on the upper and lower surfaces of the airfoil.

23. The distributed active fluid bleed system of claim 14, wherein perforations are distributed over the entirety of the upper surface of the airfoil.

24. The distributed active fluid bleed system of claim 14, wherein perforations are distributed over the entirety of the leading edge of the airfoil.

25. The distributed active fluid bleed system of claim 14, wherein perforations are configurable to modify one or more of pressure distribution, aerodynamic forces, hydrodynamic forces, voracity, or moments, of the crossflow about the airfoil when the bleed flow interacts with the crossflow.

26. The distributed active fluid bleed system of claim 14, wherein the cyclic sealing system comprises a louver hingedly affixed to the lower surface of the airfoil.

27. A method of regulating a bleed flow to modify parameters of crossflow over surfaces of a structure subject to a pressure distribution during an event, the surfaces of the structure defining a contiguous internal volume of the structure and having perforations distributed over the structure being in fluidic communication with the contiguous internal volume, the method comprising:
   cyclically providing during an open cycle availability of a cyclic portion of the perforations to fluidic communication between the contiguous internal volume and outside the structure; and
   cyclically providing during a closed cycle non-availability of the cyclic portion of the perforations to fluidic communication between the contiguous internal volume and outside the structure;
   wherein a controller regulating an actuator that is operatively coupled to a perforation mechanism controls an availability of the cyclic portion of the perforations to fluidic communication between the contiguous internal volume and outside the airfoil;
   wherein during a closed cycle, the cyclic portion of the perforations are entirely unavailable to fluidic communication;
   wherein the actuator is configured to move the perforation mechanism between the open cycle, the closed cycle, and positions therebetween;
   wherein the contiguous internal volume is common to all perforations and capable of providing nondeterministic fluidic communication between any configuration of perforations depending on:
      the availability of the perforations to fluidic communication via the perforation mechanism; and
      the pressure distribution about the structure;
   wherein a perforation is reconfigurable, and if available to fluidic communication, capable of performing as both an inlet perforation and an outlet perforation at different times;
   wherein a perforation performs as an inlet perforation when the perforation is available for fluidic communication and the pressure distribution about the airfoil is such that the perforation is subject to a surface pressure enabling fluidic flow from outside the airfoil into the contiguous internal volume;
   wherein a perforation performs as an outlet perforation when the perforation is available for fluidic communication and the pressure distribution about the airfoil is such that the perforation is subject to a surface pressure enabling fluidic flow from the contiguous internal volume to outside the airfoil; and
   wherein at least a portion of the crossflow enters the contiguous internal volume through at least a portion of the inlet perforations, and exits the contiguous internal volume through at least a portion of the outlet perforations, forming the bleed flow.

28. The method of claim 27, wherein regulating the bleed flow modifies at least one of:
   effective stiffness, structural coupling, and damping properties of the structure.

29. The method of claim 27 further comprising controlling a movement of the structure through the crossflow by modifying a shape of the structure.

30. The method of claim 27, wherein regulating the bleed flow comprises stabilizing dynamic pitching of the structure.

31. The method of claim 27, wherein regulating the bleed flow comprises suppressing aeroelastic vibration of the structure.

32. The method of claim 27, wherein the structure is selected from the group consisting of an airfoil, a hydrofoil, a building, and a sail.

33. The method of claim 27, wherein the structure comprises an airfoil in flight; and
   wherein the parameters of the crossflow over the airfoil comprise at least one of:
      pressure distribution;
      aerodynamic forces;
      hydrodynamic forces;
      vorticity; and
      moment.

* * * * *